United States Patent
Hamakita et al.

(10) Patent No.: US 8,567,553 B2
(45) Date of Patent: Oct. 29, 2013

(54) ELECTRIC POWER STEERING SYSTEM

(75) Inventors: Jun Hamakita, Kashihara (JP); Takehito Tomita, Okazaki (JP)

(73) Assignee: JTEKT Corporation, Osaka (JP)

(*) Notice: Subject to any disclaimer, the term of this patent is extended or adjusted under 35 U.S.C. 154(b) by 17 days.

(21) Appl. No.: 13/226,048

(22) Filed: Sep. 6, 2011

(65) Prior Publication Data
US 2012/0061168 A1    Mar. 15, 2012

(30) Foreign Application Priority Data
Sep. 9, 2010 (JP) .................... 2010-202082

(51) Int. Cl.
B62D 5/04 (2006.01)
(52) U.S. Cl.
USPC ............................ 180/444; 180/443; 180/446
(58) Field of Classification Search
USPC ......................... 180/444, 443, 446
See application file for complete search history.

(56) References Cited

U.S. PATENT DOCUMENTS

| | | | |
|---|---|---|---|
| 7,568,550 B2 | 8/2009 | Yasuda et al. | |
| 8,146,705 B2 * | 4/2012 | Yamamori et al. | 180/444 |
| 2006/0117883 A1 | 6/2006 | Yasuda et al. | |

FOREIGN PATENT DOCUMENTS

| | | |
|---|---|---|
| EP | 1 433 688 A2 | 6/2004 |
| EP | 1 637 769 A1 | 3/2006 |
| EP | 1 731 404 A1 | 12/2006 |
| JP | 2003-291828 | * 10/2003 |
| JP | A-2003-291828 | 10/2003 |
| JP | A-2004-232675 | 8/2004 |
| WO | WO2008/053226 A1 | 5/2008 |

OTHER PUBLICATIONS

European Search Report dated Dec. 9, 2011 issued in European Patent Application No. 11180030.6.

* cited by examiner

Primary Examiner — Tashiana Adams
Assistant Examiner — Marlon Arce
(74) Attorney, Agent, or Firm — Oliff & Berridge, PLC (57) ABSTRACT

A reduction gear coupled to an electric motor includes: a first bearing that rotatably supports a first end portion of a worm shaft such that the worm shaft is allowed to oscillate in an oscillation direction about the first end portion; and a first elastic member that elastically urges a second bearing in such a direction that an axis-to-axis distance between the worm shaft and the worm wheel reduces. The first end portion and an output shaft of the electric motor are coupled by a joint. A second elastic member located between the joint and the first end portion elastically urges the worm shaft toward a second end portion and applies a preload on the first bearing. An outer ring of the first bearing is interposed in an axial direction by the third elastic member and the fourth elastic member.

3 Claims, 8 Drawing Sheets

ELECTRIC POWER STEERING SYSTEM

INCORPORATION BY REFERENCE

The disclosure of Japanese Patent Application No. 2010-202082 filed on Sep. 9, 2010, including the specification, drawings and abstract, is incorporated herein by reference in its entirety.

BACKGROUND OF THE INVENTION

1. Field of the Invention

The invention relates to an electric power steering system.

2. Description of Related Art

Figure 8:
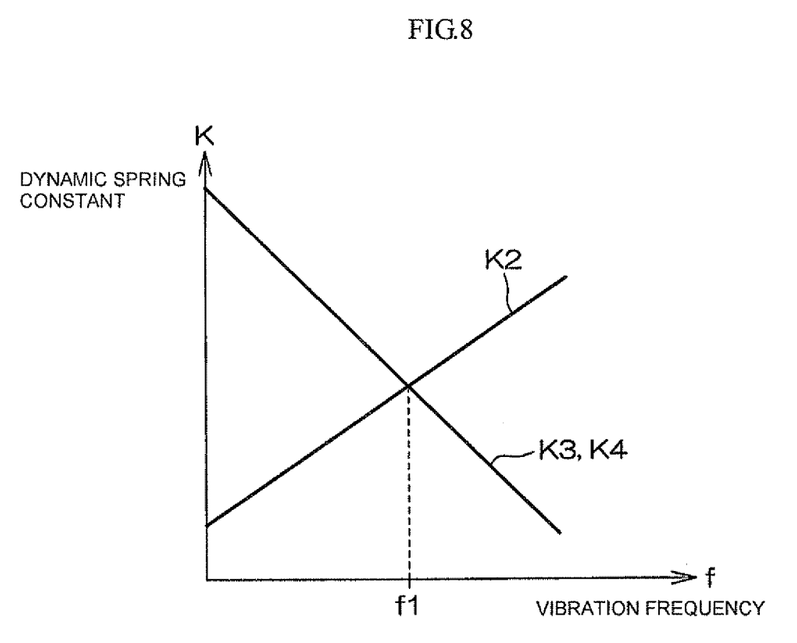
FIG. 8 is a graph that shows the correlation between a dynamic spring constant of a second elastic member and a vibration frequency, the correlation between a dynamic spring constant of a third elastic member and a vibration frequency and the correlation between a dynamic spring constant of a fourth elastic member and a vibration frequency.

In an electric power steering system in which power output from an electric motor is transmitted to a steering mechanism via a reduction mechanism, a worm reduction mechanism may be used as the reduction mechanism (for example, see FIG. 8 in Japanese Patent Application Publication No. 2004-232675 (JP-A-2004-232675)). A worm shaft of the worm reduction mechanism shown in FIG. 8 of JP-A-2004-232675 is coupled to a rotary shaft of the electric motor. Both end portions of the worm shaft are respectively supported by a housing via bearings. Because axial internal clearances of the bearings are made large, the worm shaft is movable in the axial direction.

With the above configuration, when the electric motor is not driven, for example, at the moment at which steering of a steering wheel is started, the worm shaft is movable in the axial direction by rotational force transmitted from the steering wheel to a worm wheel. Thus, it is possible to reduce a driver's steering effort when the electric motor is not driven.

However, in a state where the internal clearance of each bearing is large, when the worm shaft is displaced in the axial direction, an inner ring of each bearing is also displaced together in the axial direction, and balls of each bearing collide with the inner ring or an outer ring to generate collision noise. On the other hand, when the internal clearance of each bearing is small, displacement of the worm shaft is inhibited. Specifically, when the internal clearance of each bearing is small, an end portion of the worm shaft, which is distant from the motor, cannot be displaced toward the worm wheel. Therefore, when a tooth portion of the worm shaft abrades, it is difficult to close up a backlash between the worm shaft and the worm wheel. Therefore, there occurs collision noise resulting from a collision at the time of meshing between the worm shaft and the worm wheel.

Thus, the axial internal clearance of each bearing should be neither too large nor too small. Therefore, strict dimensional management of each bearing is required. Such dimensional management leads to an increase in manufacturing cost.

SUMMARY OF THE INVENTION

It is an object of the invention to provide a low-cost electric power steering system that is able to suppress generation of noise.

A first aspect of the invention relates to an electric power steering system that has the following configurations. A worm shaft has a first end portion and a second end portion. A worm wheel is in mesh with the worm shaft and is coupled to a steering mechanism. A first bearing rotatably supports the first end portion such that the worm shaft is allowed to oscillate about the first end portion, and includes an inner ring having a raceway groove, an outer ring having a raceway groove and rolling elements interposed between the raceway grooves. The outer ring has a pair of end surfaces that are aligned in an axial direction of the worm shaft. A second bearing rotatably supports the second end portion. A first elastic member elastically urges the second bearing in such a direction that an axis-to-axis distance between the worm shaft and the worm wheel reduces. A joint couples the first end portion to an output shaft of an electric motor such that torque is transmittable. A second elastic member is interposed between the joint and the first end portion, elastically urges the worm shaft toward the second end portion, and elastically presses the rolling elements via the worm shaft and the inner ring toward the outer ring. A housing accommodates the worm shaft and the worm wheel, and has a facing surface facing one of the pair of end surfaces and a facing surface facing the other one of the pair of end surfaces. A third elastic member is arranged between the one of the pair of end surfaces and the corresponding facing surface. A fourth elastic member is arranged between the other one of the pair of end surfaces and the corresponding facing surface.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
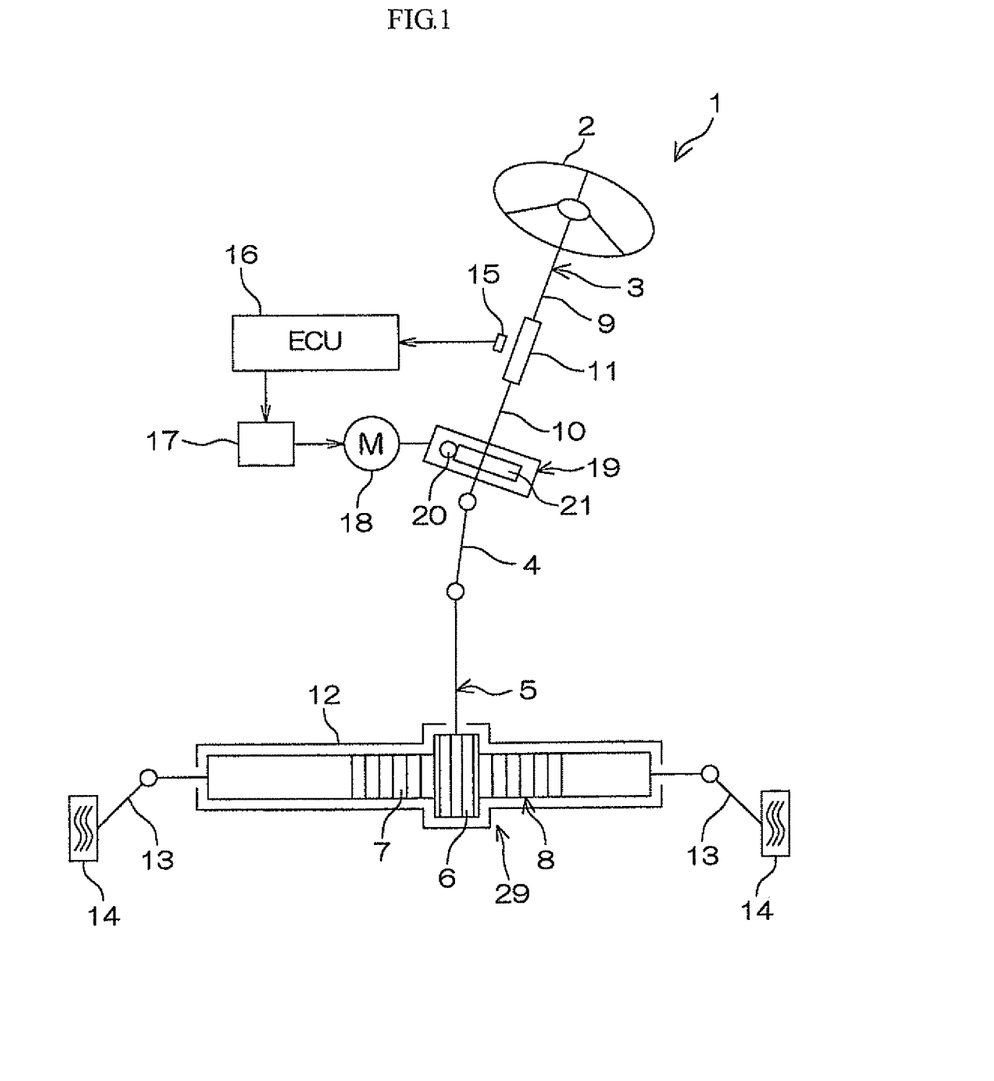
FIG. 1 is a diagram that shows the schematic configuration of an electric power steering system according to an embodiment of the invention.

Hereinafter, an embodiment of the invention will be specifically described with reference to the accompanying drawings. FIG. 1 is a diagram that shows the schematic configuration of an electric power steering system 1 according to the embodiment of the invention. As shown in FIG. 1, the electric power steering system 1 includes a steering shaft 3, a pinion shaft 5 and a rack shaft 8. The steering shaft 3 is coupled to a steering member 2, such as a steering wheel. The pinion shaft 5 is coupled to the steering shaft 3 via an intermediate shaft 4. The rack shaft 8 is a steered shaft that has a rack 7 and that extends in the lateral direction of an automobile. The rack 7 is in mesh with a pinion 6 formed on the pinion shaft 5. The pinion shaft 5 and the rack shaft 8 constitute a steering mechanism 29 formed of a rack and pinion mechanism.

The steering shaft 3 includes an input shaft 9 and an output shaft 10. The input shaft 9 is connected to the steering member 2. The output shaft 10 is coupled to the intermediate shaft 4. These input shaft 9 and output shaft 10 are coupled to each other via a torsion bar spring 11 so as to be rotatable relative to each other on the same axis. The rack shaft 8 is supported by a housing 12 via a plurality of bearings (not shown) so as to be able to reciprocate linearly. Both ends of the rack shaft 8 protrude outside the housing 12. Each end portion of the rack shaft 8 is coupled to a corresponding one of steered wheels 14 via a tie rod 13 and a knuckle arm (not shown).

When the steering member 2 is operated to rotate, the steering shaft 3 rotates. The rotation of the steering shaft 3 is converted to linear reciprocating motion of the rack shaft 8 via the pinion 6 and the rack 7. Thus, the steered wheels 14 are steered. When steering torque is input into the steering member 2, the torsion bar spring 11 twists, and the input shaft 9 and the output shaft 10 relatively rotate by a minute angle. The relative rotation displacement is detected by a torque sensor 15 provided near the steering shaft 3. Thus, torque applied to the steering member 2 is detected. A signal output from the torque sensor 15 is input into an electronic control unit (ECU) 16. The ECU 16 executes drive control over a steering assist electric motor 18 via a driving circuit 17 on the basis of the torque value, a vehicle speed given from a vehicle speed sensor (not shown), and the like.

Power output from the electric motor 18 is transmitted to the output shaft 10 of the steering shaft 3 via a reduction gear 19. Force transmitted to the output shaft 10 is transmitted to the rack shaft 8 via the pinion shaft 5, and the like. Thus, steering is assisted. The reduction gear 19 includes a worm shaft 20 and a worm wheel 21. The worm shaft 20 serves as a drive gear that is rotationally driven by the electric motor 18. The worm wheel 21 serves as a driven gear that is in mesh with the worm shaft 20. The worm wheel 21 is coupled to the steering mechanism 29 via the output shaft 10 of the steering shaft 3, and the like.

Figure 2:
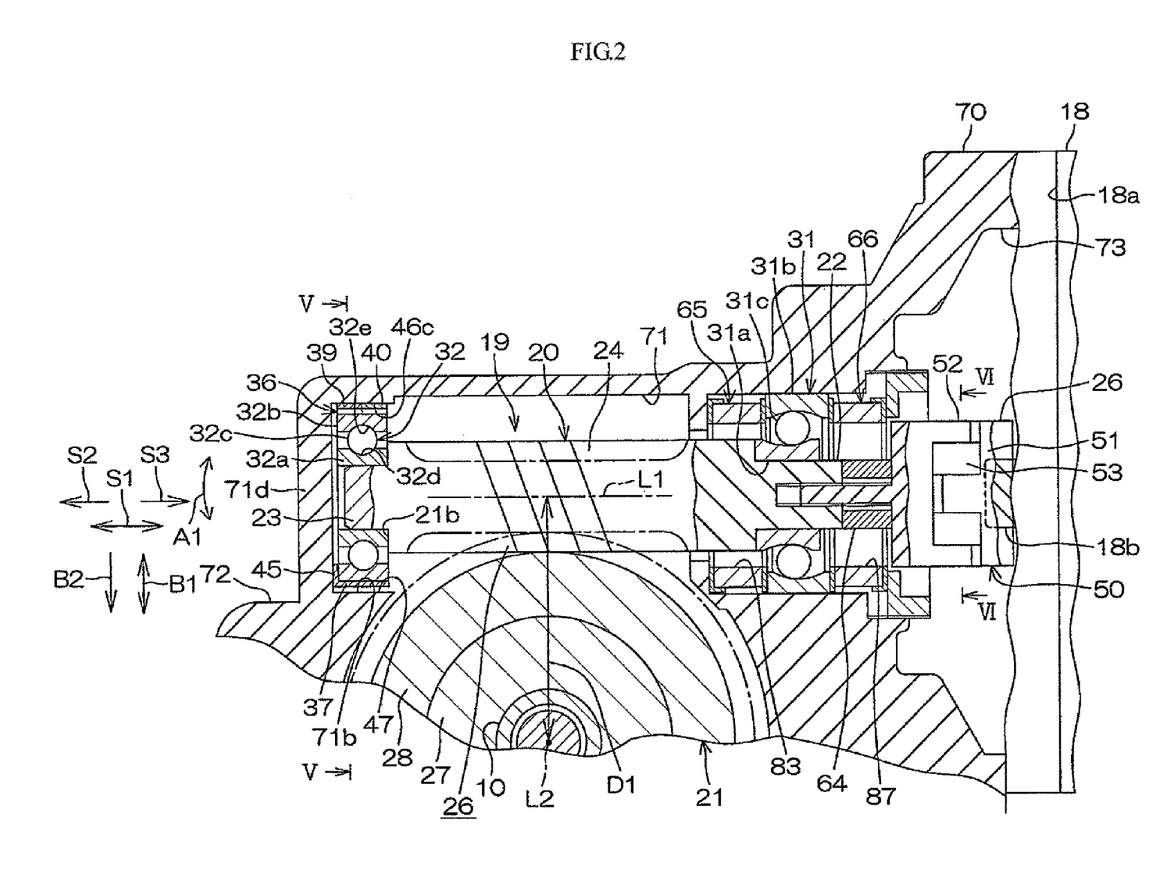
FIG. 2 is a sectional view that shows the configurations of an electric motor, a reduction gear and portions near the reduction gear.

FIG. 2 is a sectional view that shows the configuration of the electric motor 18, the reduction gear 19 and portions near the reduction gear 19. As shown in FIG. 2, the reduction gear 19 is accommodated in a housing 70. In addition, the electric motor 18 is supported by the housing 70. The housing 70 includes a cylindrical drive gear accommodating housing 71 and a cylindrical driven gear accommodating housing 72. The drive gear accommodating housing 71 accommodates the worm shaft 20. The driven gear accommodating housing 72 accommodates the worm wheel 21. The drive gear accommodating housing 71 and the driven gear accommodating housing 72 are integrally formed using metal material, such as an aluminum alloy.

An annular flange portion 73 is formed at one end portion of the drive gear accommodating housing 71. The annular flange portion 73 is integrally formed with the drive gear accommodating housing 71. A motor housing 18a of the electric motor 18 is connected to the annular flange portion 73 with fixing screws (not shown). The electric motor 18 includes the motor housing 18a and an output shaft 18b. The output shaft 18b is rotatably supported by the motor housing 18a. The output shaft 18b protrudes from the motor housing 18a toward the drive gear accommodating housing 71. The output shaft 18b is coupled to the worm shaft 20 via a joint 50 such that torque is transmittable.

The worm shaft 20 has a first end portion 22, a second end portion 23 and a columnar worm 24. The worm 24 has a tooth portion and is arranged between the first end portion 22 and the second end portion 23. The first end portion 22 is coupled to the output shaft 18b of the electric motor 18 via the joint 50 such that torque is transmittable. Thus, power output from the electric motor 18 is transmitted to the worm shaft 20. The worm wheel 21 includes an annular core 27 and a synthetic resin member 28. The core 27 is connected to the output shaft 10 so as to be rotatable together with the output shaft 10. The synthetic resin member 28 surrounds the core 27 and has teeth on its outer periphery. The core 27 is, for example, inserted in a die when the synthetic resin member 28 is molded by resin. The core 27 is, for example, press-fitted and coupled to the output shaft 10 of the steering shaft 3. Thus, the worm wheel 21 is rotatable together with the output shaft 10 but axially immovable with respect to the output shaft 10.

A first bearing 31 is arranged on the first end portion 22 of the worm shaft 20. In addition, a second bearing 32 is arranged on the second end portion 23 of the worm shaft 20. The first and second bearings 31 and 32 are, for example, rolling bearings, such as ball bearings. The worm shaft 20 is rotatably supported by the drive gear accommodating housing 71 of the housing 70 via the first bearing 31, the second bearing 32, and the like.

The worm shaft 20 is oscillatable in an oscillation direction A1 about the first bearing 31. In addition, the second end portion 23 of the worm shaft 20 is elastically urged such that the distance (axis-to-axis distance) D1 between a central axis L1 that is the axis of the worm shaft 20 and a central axis L2 that is the axis of the worm wheel 21 is reduced. This suppresses formation of a backlash in a mutual meshing region 26 at which the worm wheel 21 meshes with the worm 24 that serves as a tooth forming portion of the worm shaft 20. In addition, an internal clearance of the first bearing 31 that supports the worm shaft 20 is closed up to suppress generation of vibrations due to an excessively large internal clearance of the first bearing 31. Note that the internal clearance of the first bearing 31 means an internal clearance in the radial direction between rolling elements 31c and inner ring 31a (described later) of the first bearing 31 when the rolling elements 31c are spaced apart from the inner ring 31a, and an internal clearance in the radial direction between the rolling elements 31c and an outer ring 31b when the rolling elements 31c are spaced apart from the outer ring 31b.

The first bearing 31 is configured such that an internal clearance is formed when the axial center positions of the inner ring 31a and outer ring 31b are aligned with each other. The above described configuration for oscillating the worm shaft 20, the above described configuration for urging the worm shaft 20 toward the worm wheel 21 and the above described configuration for closing up the internal clearance of the first bearing 31 will be described below.

Figure 3:
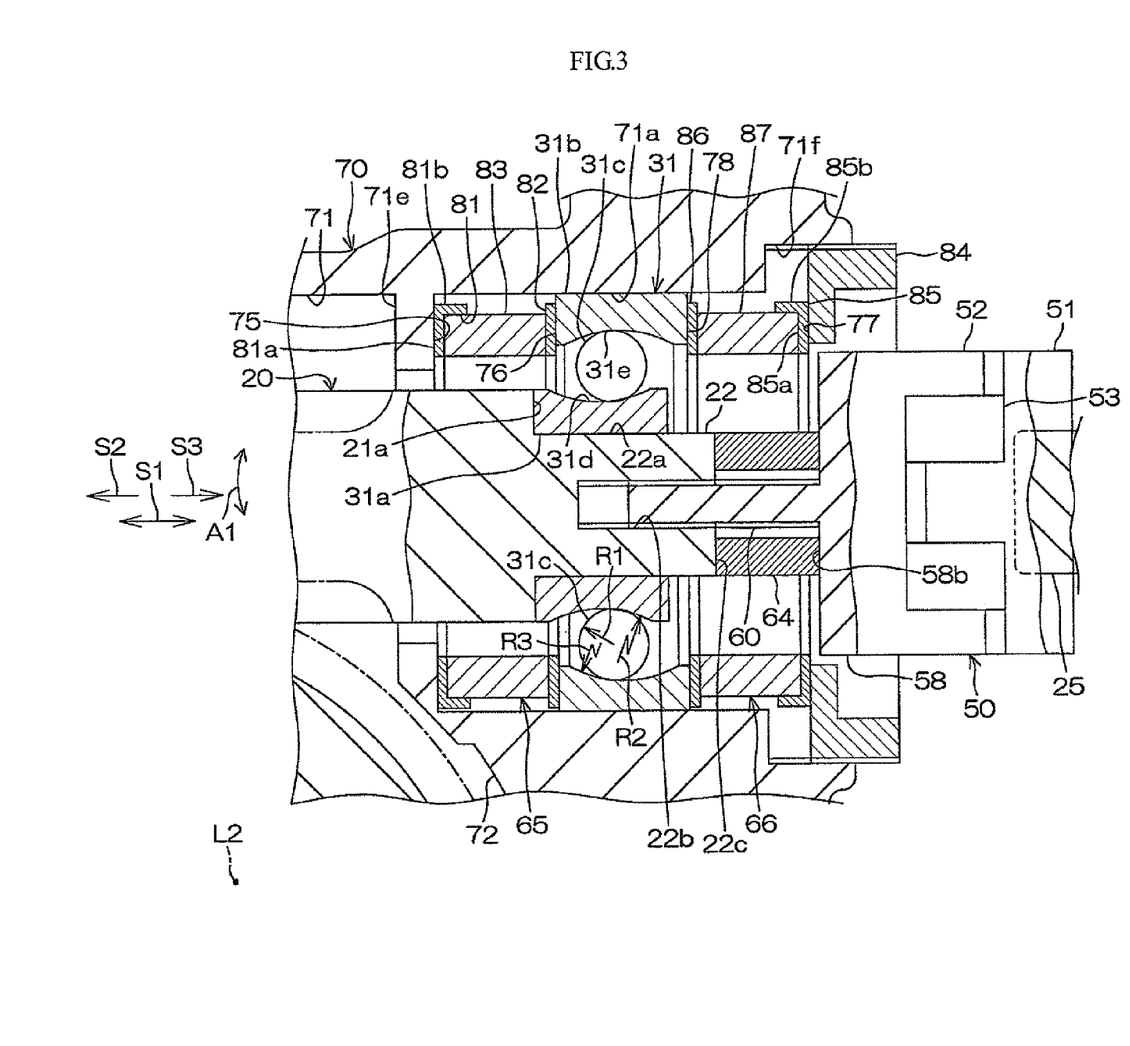
FIG. 3 is an enlarged sectional view of portions near a first bearing in FIG. 2.

FIG. 3 is an enlarged sectional view of portions near the first bearing 31 shown in FIG. 2. As shown in FIG. 3, the first bearing 31 supports the first end portion 22 of the worm shaft 20 such that the worm shaft 20 is oscillatable about the first bearing 31 in the oscillation direction A1. The first bearing 31 includes the inner ring 31a, the outer ring 31b and the rolling elements 31c. The inner ring 31a of the first bearing 31 is fitted to an outer periphery 22a of the first end portion 22. The inner ring 31a is fixed to the first end portion 22 by press fitting, or the like, and is rotatable together with the worm shaft 20 and movable together with the worm shaft 20. One end surface of the inner ring 31a is received by an annular step 21a between the first end portion 22 and the worm 24.

The outer ring 31b of the first bearing 31 is supported by a first bearing support portion 71a that is formed in the inner peripheral surface of the drive gear accommodating housing 71. The outer ring 31b is fitted to the first bearing support portion 71a by clearance fit, or the like. The outer ring 31b is movable in the longitudinal direction of the drive gear accommodating housing 71 relative to the drive gear accommodating housing 71. The rolling elements 31c of the first bearing 31 are interposed between a raceway groove 31d of the outer peripheral surface of the inner ring 31a and a raceway groove 31e of the inner peripheral surface of the outer ring 31b. The rolling elements 31c of the first bearing 31 are formed of balls, and have the same curvature radius. In a sectional plane (sectional plane shown in FIG. 2) that includes the central axis of the first bearing 31 and the center of any one of the rolling elements 31c, the curvature radius R1 of the rolling element 31c is smaller than the curvature radius R2 of the raceway groove 31d of the inner ring 31a and is smaller than the curvature radius R3 of the raceway groove 31e of the outer ring 31b.

With the above configuration, the inner ring 31a of the first bearing 31 is oscillatable in the oscillation direction A1 with respect to the outer ring 31b. The oscillation direction A1 is a direction that includes a clockwise direction and a counterclockwise direction about the first bearing 31 when the worm shaft 20 is viewed along the central axis L2 of the worm wheel 21. As shown in FIG. 2, the second bearing 32 includes an inner ring 32a, an outer ring 32b and rolling elements 32c. The inner ring 32a of the second bearing 32 is fitted to an outer periphery of the second end portion 23. One end surface of the inner ring 32a is received by an annular step 21b between the second end portion 23 and the worm 24.

The outer ring 32b of the second bearing 32 is supported by a second bearing support portion 71b that is formed in the inner peripheral surface of the drive gear accommodating housing 71. More specifically, the outer ring 32b is supported by the second bearing support portion 71b via a first elastic member 36. Thus, the second bearing 32 and the second end portion 23 are movable relative to each other in a facing direction B1, in which the central axis L1 of the worm shaft 20 faces the central axis L2 of the worm wheel 21, with respect to the drive gear accommodating housing 71.

Figure 4:
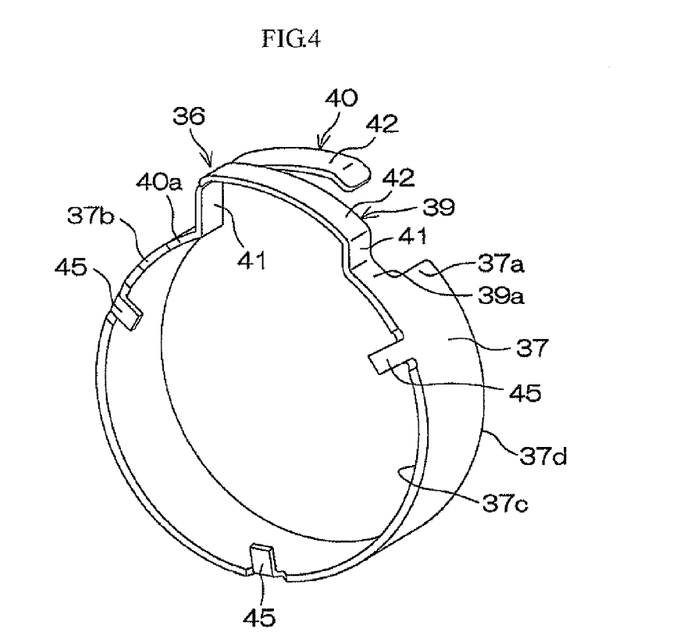
FIG. 4 is a perspective view of a first elastic member.
Figure 5:
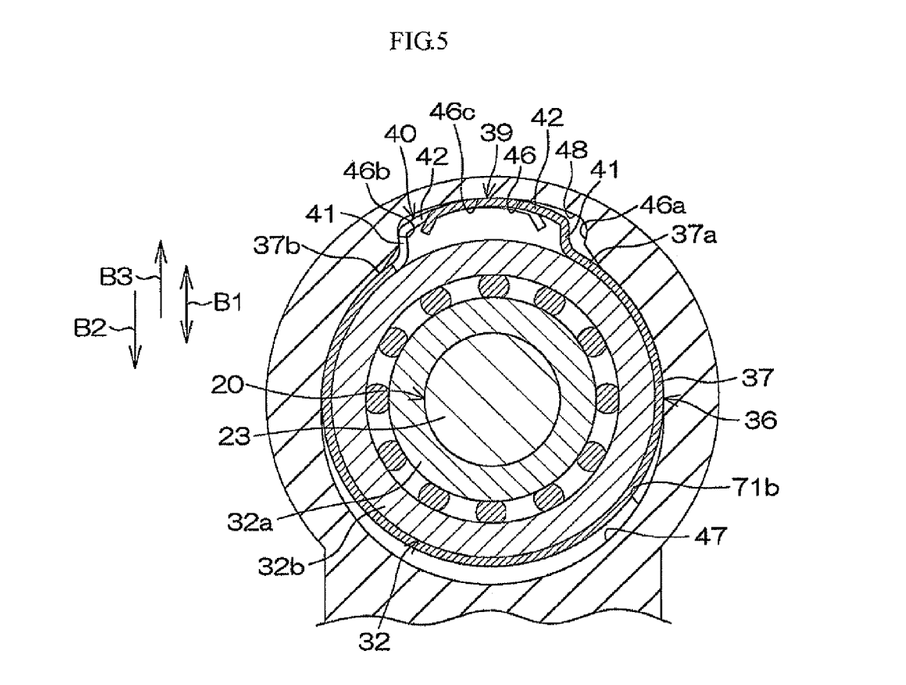
FIG. 5 is a sectional view taken along the line V-V in FIG. 2.

The rolling elements 32c of the second bearing 32 are formed of balls, and have the same curvature radius. In a sectional plane (sectional plane shown in FIG. 2) that includes the central axis of the second bearing 32 and the center of any one of the rolling elements 32c, the curvature radius of the rolling element 32c of the second bearing 32, the curvature radius of a raceway groove 32d of the outer peripheral surface of the inner ring 32a and the curvature radius of a raceway groove 32e of the inner peripheral surface of the outer ring 32b are substantially the same. FIG. 4 is a perspective view of the first elastic member 36. FIG. 5 is a sectional view taken along the line V-V in FIG. 2. As shown in FIG. 4 and FIG. 5, the first elastic member 36 is a leaf spring member. The first elastic member 36 is, for example, integrally formed using stainless steel or spring steel.

The first elastic member 36 includes an annular main portion 37 having terminal ends and hook-shaped (L-shaped) first and second elastic tongues 39 and 40. The annular main portion 37 having terminal ends surrounds the outer ring 32b of the second bearing 32. The hook-shaped (L-shaped) first and second elastic tongues 39 and 40 are respectively supported at one end in a cantilever manner by a pair of end portions 37a and 37b of the main portion 37. A base end portion 39a of the first elastic tongue 39 and a base end portion 40a of the second elastic tongue 40 are respectively coupled to the end portions 37a and 37b of the main portion 37.

The first and second elastic tongues 39 and 40 each have a first portion 41 and a second portion 42. The first portions 41 respectively extend from the corresponding end portions 37a and 37b of the main portion 37 toward the other side B3 of the facing direction 131. The second portions 42 respectively extend from the end portions of the first portions 41, and extend perpendicularly to the first portions 41. The width of each of the first and second elastic tongues 39 and 40 in the axial direction of the first elastic member 36 is narrower than the width of the main portion 37. The first elastic tongue 39 is arranged at one end portion 37c in the axial direction of the main portion 37. The second elastic tongue 40 is arranged at the other end portion 37d in the axial direction.

A plurality of elastic protrusions 45 is provided at the one end portion 37c of the main portion 37. The elastic protrusions 45 extend radially inward of the main portion 37 from the one end portion 37c. Each elastic protrusion 45 is inclined outward in the axial direction of the main portion 37c with respect to the one end portion 37c. The elastic protrusions 45 are arranged at equiangular intervals in the circumferential direction of the main portion 37. Each elastic protrusion 45 is received by an end wall 71d of the drive gear accommodating housing 71.

As shown in FIG. 2 and FIG. 5, each elastic protrusion 45 is in contact with one end surface of the outer ring 32b of the second bearing 32. A first recess 46 is formed in the inner peripheral surface of the second bearing support portion 71b. The first recess 46 has a pair of inner wall surfaces 46a and 46b and a bottom portion 46c. The inner wall surfaces 46a and 46b face each other in the circumferential direction of the second bearing 32. The second bearing 32 is supported by the second bearing support portion 71b via the first elastic member 36 so as to be displaced in such a direction that the axis-to-axis distance D1 between the worm shaft 20 and the worm wheel 21 increases or reduces (facing direction B1). The first and second elastic tongues 39 and 40 of the first elastic member 36 are elastically deformed when the second portions 42 are received by the bottom portion 46c of the first recess 46. Owing to elastic repulsion force resulting from the elastic deformation, the first elastic member 36 elastically urges the worm shaft 20 via the second bearing 32 toward one side B2 (direction in which the axis-to-axis distance D1 reduces) of the facing direction B1.

Thus, the worm shaft 20 is elastically urged about the first bearing 31 (first end portion 22) such that the mutual axis-to-axis distance D1 between the worm shaft 20 and the worm wheel 21 reduces. As a result, a backlash between the worm 24 of the worm shaft 20 and the worm wheel 21 is kept at zero. In addition, the second bearing support portion 71b has a second recess 47 facing the first recess 46 in the facing direction B1. Because the second recess 47 is formed, the first elastic member 36, the second bearing 32 and the second end portion 23 may be displaced toward the one side B2 of the facing direction B1.

The joint 50 allows the worm shaft 20 to oscillate in the oscillation direction A1, that is, allows the worm shaft 20 to oscillate about the first bearing 31, and couples the worm shaft 20 to the output shaft 18b of the electric motor 18 such that torque is transmittable. The joint 50 includes a first engagement member 51, a second engagement member 52 and an elastic member 53. The first engagement member 51 is coupled to the output shaft 18b of the electric motor 18 so as to be rotatable together with the output shaft 18b. The second engagement member 52 is coupled to the first end portion 22 of the worm shaft 20 of the reduction gear 19 so as to be rotatable together with the worm shaft 20. The elastic member 53 is interposed between the first and second engagement members 51 and 52, and transmits torque from the first engagement member 51 to the second engagement member 52.

Figure 6:
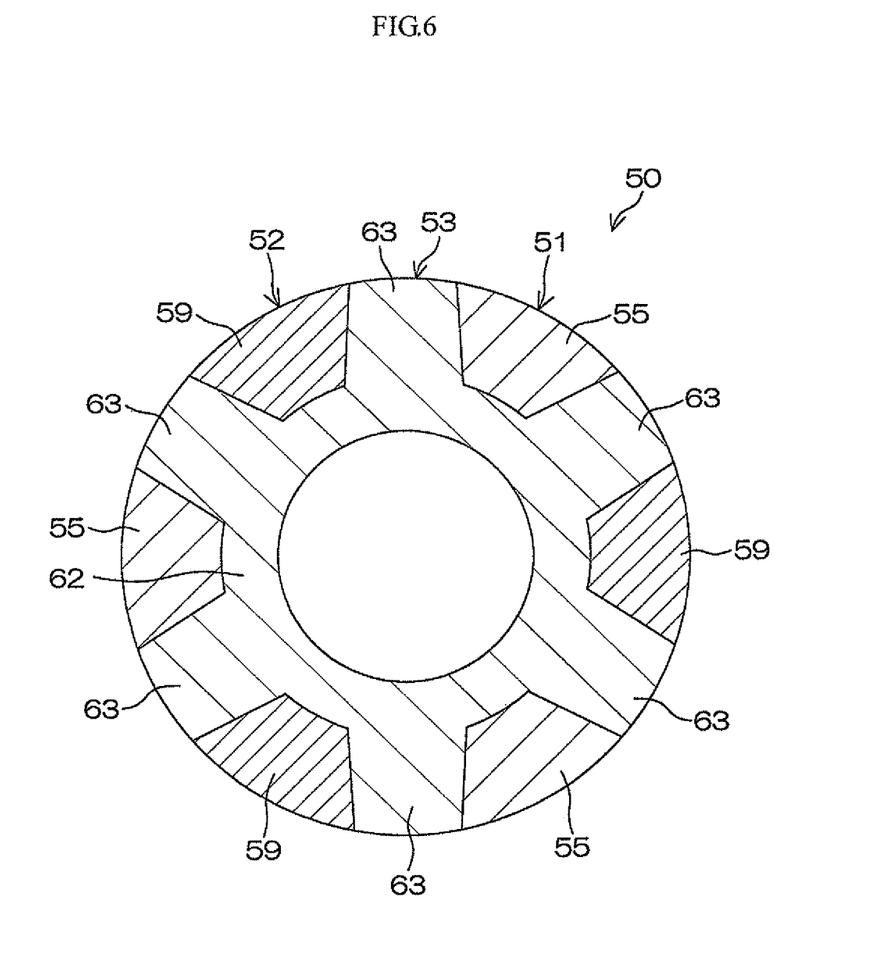
FIG. 6 is a sectional view of a joint, taken along the line VI-VI in FIG. 2.
Figure 7:
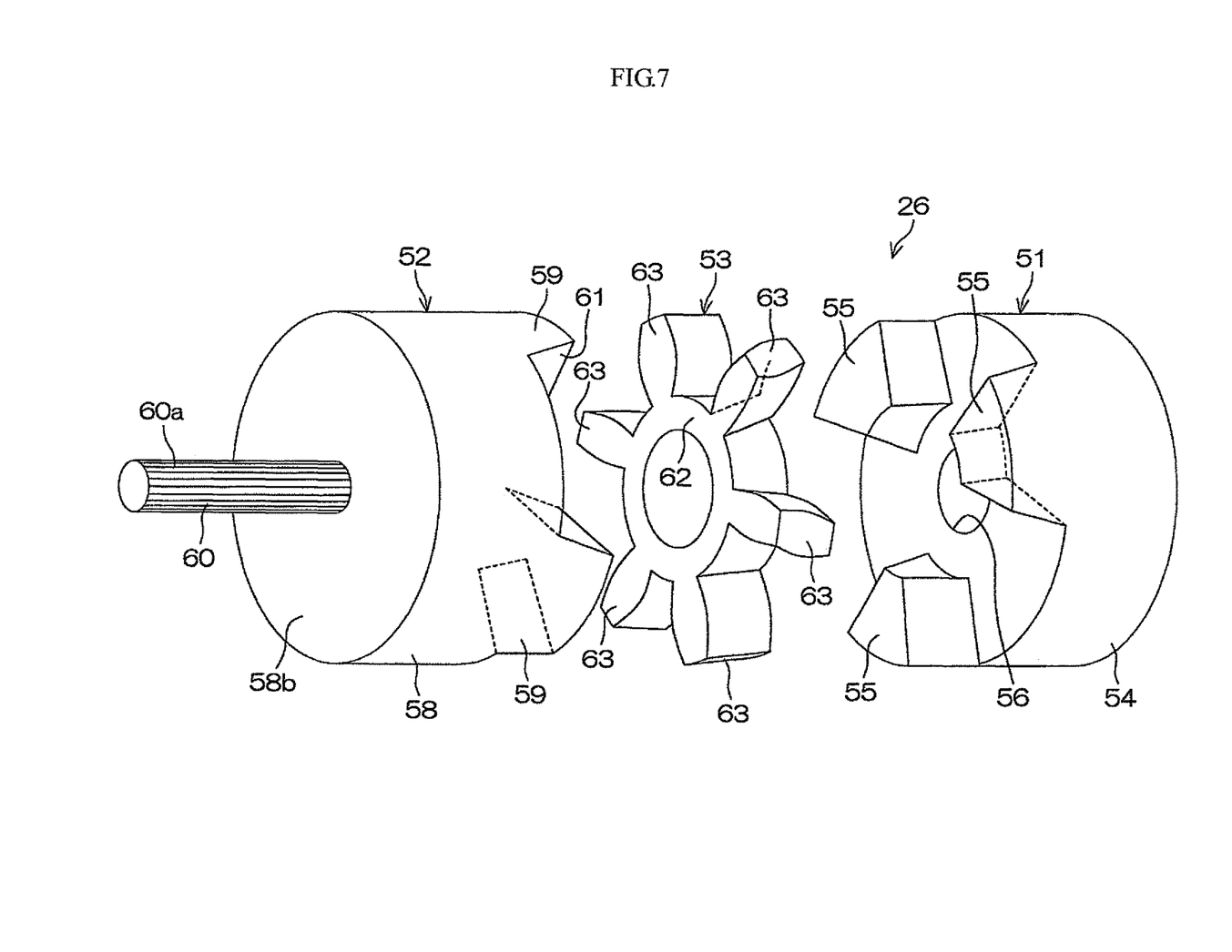
FIG. 7 is an exploded perspective view of the joint.

FIG. 6 is a sectional view of the joint 50, taken along the line VI-VI in FIG. 2. FIG. 7 is an exploded perspective view of the joint 50. As shown in FIG. 7, the first engagement member 51 is, for example, formed of metal. The first engagement member 51 has a cylindrical first main portion 54 and a plurality of first engagement protrusions 55. The first engagement protrusions 55 are formed so as to protrude from one end surface of the first main portion 54. The first main portion 54 has a first fitting hole 56 into which the output shaft 18b of the electric motor 18 is fixedly press-fitted. The first engagement protrusions 55 are arranged at equiangular intervals in the circumferential direction of the first main portion 54.

The second engagement member 52 is, for example, formed of metal. The second engagement member 52 has a columnar second main portion 58, a plurality of second engagement protrusions 59 and a coupling shaft portion 60. The second engagement protrusions 59 are formed so as to protrude from one end surface of the second main portion 58. The coupling shaft portion 60 is formed to protrude from the other end surface 58b of the second main portion 58. The second engagement protrusions 59 are arranged at equiangular intervals in the circumferential direction of the second main portion 58. The coupling shaft portion 60 is a columnar portion that has a diameter smaller than that of the second main portion 58. An external tooth portion 60a, such as spline teeth, is formed all around the outer periphery of the coupling shaft portion 60.

As shown in FIG. 3, the coupling shaft portion 60 is inserted in an internal tooth portion 22b formed at the first end portion 22 of the worm shaft 20. The internal tooth portion 22b, for example, has spline teeth formed over all around. Thus, the coupling shaft portion 60 is rotatable together with the first end portion 22 of the worm shaft 20 and movable relative to the first end portion 22 in the axial direction S1 of the worm shaft 20. As shown in FIG. 7, the elastic member 53 is, for example, formed of synthetic rubber or synthetic resin. The elastic member 53 has an annular main portion 62 and a plurality of engagement arms 63. The engagement arms 63 extend radially from the peripheral surface of the main portion 62. The engagement arms 63 are arranged at equiangular intervals in the circumferential direction of the main portion 62.

As shown in FIG. 6, the first engagement member 51, the second engagement member 52 and the elastic member 53 are assembled together such that the first engagement protrusions 55, the second engagement protrusions 59 and the engagement arms 63 are in mesh with one another. Specifically, the first engagement protrusions 55 and the second engagement protrusions 59 are in mesh with each other with the engagement arms 63 placed in between in the circumferential direction. As shown in FIG. 3, when the worm shaft 20 oscillates about the first bearing 31 in the oscillation direction A1, the second engagement member 52 is displaced so as to be inclined with respect to the first engagement member 51. Thus, the joint 50 couples the output shaft 18b of the electric motor 18 to the first end portion 22 of the worm shaft 20 such that torque is transmittable, and, at the same time, allows the worm shaft 20 to oscillate in the oscillation direction A1.

A second elastic member 64 is arranged between the joint 50 and the first end portion 22 of the worm shaft 20. Note that, in the present embodiment, the second elastic member 64 is formed so as to surround the worm shaft 20; however, the shape of the second elastic member 64 is not limited to this shape. For example, the second elastic member 64 may be arranged between the first engagement member 51 and second engagement member 52 of the joint 50. The second elastic member 64 is provided in order to apply static load to the worm shaft 20 to elastically urge the worm shaft 20 toward one side S2 (from the first end portion 22 toward the second end portion 23) in the axial direction S1. The second elastic member 64 is, for example, formed in a cylindrical shape using rubber, or the like, and surrounds the coupling shaft portion 60.

The second elastic member 64 is arranged between the other end surface 58b of the second main portion 58 of the second engagement member 52 of the joint 50 and an end surface 22c of the first end portion 22 of the worm shaft 20. The second elastic member 64 is elastically compressed by these second engagement member 52 and first end portion 22. As shown in FIG. 2, owing to elastic repulsion force resulting from the compression of the second elastic member 64, the worm shaft 20 is elastically urged toward the second end portion 23. The elastic repulsion force is transmitted to the worm shaft 20, the inner ring 32a of the second bearing 32, the rolling elements 32c, the outer ring 32b and the first elastic member 36 in this order. As a result, a preload is applied to the second bearing 32, and the internal clearance of the second bearing 32 is closed up.

In addition, the elastic repulsion force of the second elastic member 64 is transmitted to the inner ring 31a of the first bearing 31 and the rolling elements 31c via the first end portion 22 of the worm shaft 20, and the rolling elements 31c are elastically pressed against the outer ring 31b. The elastic repulsion force of the second elastic member 64, transmitted to the outer ring 31b, is received by the drive gear accommodating housing 71 via a third elastic member unit 65 (described later). Owing to the elastic repulsion force of the second elastic member 64, the inner ring 31a is displaced toward the one side S2 in the axial direction S1 with respect to the outer ring 31b, and the center positions of the inner ring 31a and outer ring 31b deviate from each other in the axial direction S1. Thus, the rolling elements 31c are elastically pressed against the inner ring 31a and the outer ring 31b, and the internal clearance of the first bearing 31 is closed up.

Elastic member units are arranged on respective sides of the first bearing 31 in the axial direction S1. Specifically, the third elastic member unit 65 is arranged on one side S2 in the axial direction S1 with respect to the first bearing 31. In addition, a fourth elastic member unit 66 is arranged on the other side S3 in the axial direction S1 with respect to the first bearing 31. As shown in FIG. 3, the drive gear accommodating housing 71 has an annular portion 71e that has an annular first facing surface 75. The third elastic member unit 65 is arranged between the first facing surface 75 and one end surface 76 of the outer ring 31b of the first bearing 31.

The third elastic member unit 65 is provided to close up the internal clearance of the first bearing 31 in cooperation with the second elastic member 64. In addition, when vibration force along the axial direction S1 is input into the first bearing 31, the third elastic member unit 65 is able to damp the vibrations (dynamic excitation force) of the first bearing 31 in cooperation with the fourth elastic member unit 66. The third elastic member unit 65 includes a pair of side plates 81 and 82 and a third elastic member 83. The side plates 81 and 82 are arranged in the axial direction S1. The third elastic member 83 is arranged between the side plates 81 and 82. The plates 81 and 82 are formed using metal plates.

One side plate 81 has an annular side plate body 81a and a stopper portion 81b. The stopper portion 81b protrudes from the radially outer portion of the side plate body 81a toward the outer ring 31b of the first bearing 31. The side plate body 81a is received by the first facing surface 75. The first facing surface 75 faces the one end surface 76 of the outer ring 31b of the first bearing 31 in the axial direction S1. The stopper portion 81b is, for example, formed in an annular shape, and surrounds the outer periphery of the third elastic member 83. In an initial state (factory default state) of the electric power steering system 1, the length of the stopper portion 81b is shorter in the axial direction S1 than the length of the third elastic member 83. The stopper portion 81b faces the other side plate 82 in the axial direction S1.

The other side plate 82 is formed in an annular shape. The other side plate 82 is in contact with and received by the one end surface 76 of the outer ring 31b of the first bearing 31. The third elastic member 83 is formed in an annular shape using an elastic member, such as rubber. The third elastic member 83 is bonded to the side plate body 81a of the one side plate 81 by, for example, vulcanization adhesion. In addition, the third elastic member 83 is bonded to the other side plate 82 by, for example, vulcanization adhesion. The third elastic member 83 is located inward of the stopper portion 81b of the one side plate 81 in the radial direction of the third elastic member 83. The third elastic member 83 is arranged between the first facing surface 75 of the housing 70 and the one end surface 76 of the outer ring 31b of the first bearing 31.

With the above configuration, when the amount of compression of the third elastic member 83 increases, the stopper portion 81b contacts the other side plate 82. Thus, it is possible to suppress excessive compression of the third elastic member 83. Elastic repulsion force resulting from the compression of the second elastic member 64 is transmitted to the third elastic member unit 65. Specifically, the elastic repulsion force of the second elastic member 64 is transmitted to the inner ring 31a of the first bearing 31 via the first end portion 22 of the worm shaft 20.

The elastic repulsion force transmitted to the inner ring 31a of the first bearing 31 presses the rolling elements 31c toward the one side S2 in the axial direction S1, and further presses the rolling elements 31c against the outer ring 31b. The elastic repulsion force transmitted to the outer ring 31b is transmitted to the third elastic member unit 65. Thus, in the initial state or when the vehicle is running straight on a flat road, the third elastic member 83 is elastically compressed. In addition, the internal clearances between the rolling elements 31c of the first bearing 31 and both the inner ring 31a and outer ring 31b are closed up.

An internal thread portion 71f is formed at one end of the drive gear accommodating housing 71. An annular nut member 84 is screwed to the internal thread portion 71f. The housing 70 includes the integrally formed drive gear accommodating housing 71 and driven gear accommodating housing 72 and the nut member 84. One end surface of the nut member 84, facing the first bearing 31, is a second facing surface 77. The second facing surface 77 faces the other end surface 78 of the outer ring 31b of the first bearing 31 in the axial direction S1.

The fourth elastic member unit 66 is arranged between the second facing surface 77 and the other end surface 78. The fourth elastic member unit 66 includes a pair of side plates 85 and 86 and a fourth elastic member 87. The side plates 85 and 86 are arranged in the axial direction S1. The fourth elastic member 87 is arranged between the side plates 85 and 86. The side plates 85 and 86 are formed using metal plates. One side plate 85 has an annular side plate body 85a and a stopper portion 85b. The stopper portion 85b protrudes from the radially outer portion of the side plate body 85a toward the outer ring 31b of the first bearing 31. The side plate body 85a is received by the second facing surface 77 of the nut member 84. The second facing surface 77 faces the other end surface 78 of the outer ring 31b of the first bearing 31 in the axial direction S1.

The stopper portion 85b is, for example, formed in an annular shape, and surrounds the outer periphery of the fourth elastic member 87. When the electric power steering system 1 is in the initial state, the length of the stopper portion 85b is shorter in the axial direction S1 than the length of the fourth elastic member 87. The stopper portion 85b faces the other side plate 86 in the axial direction S1. The other side plate 86 is formed in an annular shape. The other side plate 86 is in contact with and received by the other end surface 78 of the outer ring 31b of the first bearing 31.

The fourth elastic member 87 is formed in an annular shape using the same material as that of the third elastic member 83. The fourth elastic member 87 is bonded to the side plate body 85a of the one side plate 85 by, for example, vulcanization adhesion. In addition, the fourth elastic member 87 is bonded to the other side plate 86 by, for example, vulcanization adhesion. The fourth elastic member 87 is located inward of the stopper portion 85b of the one side plate 85 in the radial direction of the fourth elastic member 87. The fourth elastic member 87 is arranged between the second facing surface 77 of the housing 70 and the other end surface 78 of the outer ring 31b of the first bearing 31.

In the initial state or when the vehicle is running straight on a flat road, the fourth elastic member 87 elastically urges the other end surface 78 of the outer ring 31b of the first bearing 31 toward the one side S2 in the axial direction S1. The dynamic spring constant K2 of the second elastic member 64 when the second elastic member 64 oscillates at a high frequency is higher than the dynamic spring constant K3 of the third elastic member 83 when the third elastic member 83 oscillates at a high frequency. The dynamic spring constant K3 of the third elastic member 83 is equal to the dynamic spring constant K4 of the fourth elastic member 87.

FIG. 8 is a graph that shows the correlation between the dynamic spring constant K2 of the second elastic member 64 and a vibration frequency f, the correlation between the dynamic spring constant K3 of the third elastic member and a vibration frequency f and the correlation between the dynamic spring constant K4 of the fourth elastic member 87 and a vibration frequency f. As shown in FIG. 8, the dynamic spring constant K2 of the second elastic member 64 is set so as to increase as the vibration frequency f of the second elastic member 64 increases. On the other hand, the dynamic spring constant K3 of the third elastic member 83 is set so as to reduce as the vibration frequency f of the third elastic member 83 increases. Similarly, the dynamic spring constant K4 of the fourth elastic member 87 is set so as to reduce as the vibration frequency f of the fourth elastic member 87 increases.

When the vibration frequency f is higher than a predetermined vibration frequency f1, the second elastic member 64, the third elastic member 83 and the fourth elastic member 87 each vibrate at a high frequency. At this time, the dynamic spring constant K2 of the second elastic member 64 is higher than the dynamic spring constant K3 of the third elastic member 83 and is higher than the dynamic spring constant K4 of the fourth elastic member 87. Next, the operation of portions near the worm shaft 20 will be described.

As shown in FIG. 1, when the vehicle is running on, for example, a rough road of which the road surface has large bumps, force (reverse input) is input into the worm wheel 21 from the road surface to the worm wheel 21 via the steered wheel 14, the steering mechanism 29, and the like. As shown in FIG. 2, the reverse input acts as force that causes the worm wheel 21 to vibrate at a high frequency in the circumferential direction of the worm wheel 21. At this time, the vibration frequency of the reverse input is high, so the dynamic spring constant K2 of the second elastic member 64 is high. Here, vibration force (load value) of reverse input is relatively small, the second elastic member 64 is not elastically deformed by the reverse input. Thus, the worm shaft 20 is not displaced in the axial direction S1. At this time, the state where the internal clearance of the first bearing 31 is closed up is maintained by the second elastic member 64. This suppresses vibrations due to an excessively large internal clearance of the first bearing 31.

Figure 9:
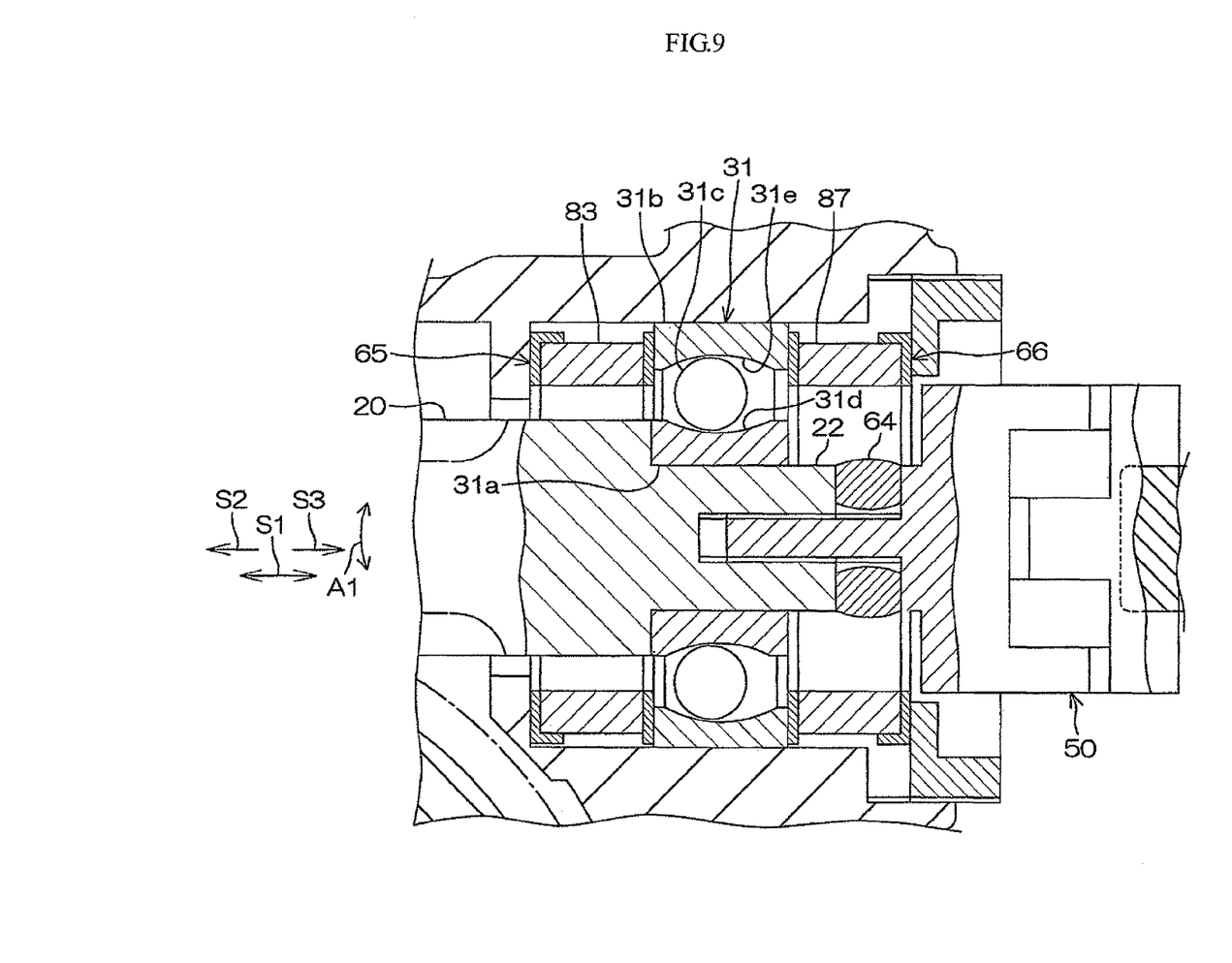
FIG. 9 is a sectional view of a main portion for illustrating the operation of portions near a worm shaft.

In addition, because the first elastic member 36 urges the second end portion 23 of the worm shaft 20 via the second bearing 32 toward the one side B2 in the facing direction B1, a backlash between the worm shaft 20 and the worm wheel 21 is closed up. Thus, no vibrations (meshing rattle sound) do not occur between the worm shaft 20 and the worm wheel 21. On the other hand, when vibration force (load value) of reverse input is relative large, that is, when reverse input is larger than the elastic resistance of the second elastic member 64, the worm wheel 21 displaces the worm shaft 20 toward the other side S3 in the axial direction S1 against the elastic resistance of the second elastic member 64. At this time, as shown in FIG. 9, the inner ring 31a of the first bearing 31 generates high-frequency vibrations along the axial direction S1 together with the worm shaft 20.

As a result, the first bearing 31 vibrates at a high frequency. At this time, the internal clearance occurs in the first bearing 31, and the outer ring 31b of the first bearing 31 vibrates at a high frequency in the axial direction S1 with respect to the housing 70. The high-frequency vibrations of the outer ring 31b are damped by the third elastic member 83 and the fourth elastic member 87. The third elastic member 83 and the fourth elastic member 87 respectively have low dynamic spring constants K3 and K4 at a high-frequency vibration, so the high-frequency vibrations of the outer ring 31b are reliably reduced.

As described above, according to the present embodiment, the first elastic member 36 urges the second end portion 23 of the worm shaft 20 via the second bearing 32 to thereby make it possible to elastically press the worm shaft 20 against the worm wheel 21. As a result, even when the meshing region 26 at which the worm shaft 20 meshes with the worm wheel 21 abrades, the state where a backlash between the worm shaft 20 and the worm wheel 21 is closed up may be maintained. Therefore, it is possible to suppress rattle (vibrations) between the worm shaft 20 and the worm wheel 21 for a long period of time.

Thus, when reverse input that is force input from a road surface to the meshing region 26 at which the worm wheel 21 meshes with the worm shaft 20 is input through the steering mechanism 29, and the like, for example, while the vehicle is running on a rough road, it is possible to suppress vibrations of the worm wheel 21 with respect to the worm shaft 20 due to the reverse input. Thus, it is possible to suppress generation of rattle sound (meshing sound) in the meshing region 26 at which the worm shaft 20 meshes with the worm wheel 21.

In addition, the inner ring 31a of the first bearing 31 is urged by the second elastic member 64 and is pressed against the rolling elements 31c, and the rolling elements 31c are further pressed against the outer ring 31b to thereby apply a preload on the first bearing 31. Thus, it is possible to close up the internal clearance of the first bearing 31. Thus, it is possible to suppress collision sound resulting from a collision between the rolling elements 31c and the inner ring 31a due to the internal clearance of the first bearing 31 and collision sound resulting from a collision between the rolling elements 31c and the outer ring 31b. That is, it is possible to suppress generation of rattle sound (bearing rattle sound) due to the internal clearance of the first bearing 31.

As described above, complicated work for setting the internal clearance of the first bearing 31 to an appropriate value is no longer necessary to allow oscillation of the worm shaft 20 and reduce bearing rattle sound. That is, it is not necessary to strictly manage the internal clearance of the first bearing 31, so manufacturing cost may be reduced. In addition, when large reverse input is input into the worm shaft 20 as vibration force during running on a rough road, or the like, the worm shaft 20 vibrates in the axial direction S1 against the urging force of the second elastic member 64 due to the large reverse input. Thus, the first bearing 31 also vibrates at a high frequency along the axial direction S1. However, the third elastic member 83 and the fourth elastic member 87 are arranged on respective sides of the outer ring 31b of the first bearing 31. Thus, vibrations of the first bearing 31 may be absorbed by the third elastic member 83 and the fourth elastic member 87. Thus, even when large reverse input is applied, bearing rattle sound may be suppressed.

Furthermore, the dynamic spring constant K2 when the second elastic member 64 vibrates at a high frequency is higher than the dynamic spring constants K3 and K4 when the third and fourth elastic members 83 and 87 vibrate at a high frequency. Thus, the dynamic spring constant K2 of the second elastic member 64 is set so as to be relatively high. Thus, the worm shaft 20 and the first bearing 31 may be configured so as not to easily vibrate along the axial direction S1 when vibration force is applied from the steering mechanism 29, and the like, to the worm shaft 20 via the worm wheel 21. Thus, it is possible to suppress vibrations of the first bearing 31, so generation of bearing rattle sound of the first bearing 31 may be suppressed.

In addition, when the worm shaft 20 receives large reverse input and, therefore, the worm shaft 20 vibrates at a high frequency along the axial direction S1 against the elastic resistance of the second elastic member 64, the high-frequency vibrations are transmitted to the first bearing 31. However, because the dynamic spring constant K3 of the third elastic member 83 and the dynamic spring constant K4 of the fourth elastic member 87 are relatively low, vibration force transmitted to the first bearing 31 is reliably damped by the third elastic member 83 and the fourth elastic member 87. As a result, it is possible to suppress generation of bearing rattle sound of the first bearing 31.

In this way, when the dynamic spring constant K2 of the second elastic member 64 is high and the dynamic spring constants K3 and K4 of the third and fourth elastic member 83 and 87 are low at the time of high-frequency vibrations, it is possible to further reliably suppress generation of bearing rattle sound of the first bearing 31. The invention is not limited to the details of the above described embodiment, and various modifications may be made within the scope of the appended claims.

For example, the joint 50 that includes the first engagement member 51, the second engagement member 52 and the elastic member 53 is used as a joint; however, the joint is not limited to the joint 50. Instead of the joint 50, another joint, such as a spline joint and a serration joint, may be used. When the spline joint or the serration joint is used instead of the joint 50, a cylindrical member of which the inner peripheral surface has an internal tooth portion is fixedly press-fitted to the output shaft 18b of the electric motor 18, the outer peripheral surface of the first end portion 22 of the worm shaft 20 has an external tooth portion, and then the external tooth portion is inserted in the internal tooth portion. By providing an appropriate gap between the external tooth portion and the internal tooth portion, the worm shaft 20 is allowed to oscillate in the oscillation direction A1.

In addition, in the third elastic member unit 65, the side plates 81 and 82 between which the third elastic member 83 is interposed may be omitted. Similarly, in the fourth elastic member unit 66, the side plates 85 and 86 between which the fourth elastic member 87 is interposed may be omitted. Furthermore, in the above embodiment, as the vibration frequency increases, the dynamic spring constant K2 of the second elastic member 64 increases, and the dynamic spring constants K3 and K4 of the third and fourth elastic members 83 and 87 decrease; however, the invention is not limited to this configuration. The second elastic member 64 may have a constant dynamic spring constant K2 irrespective of a vibration frequency.

In addition, the third and fourth elastic members 83 and 87 may respectively have constant dynamic spring constants K3 and K4 irrespective of a vibration frequency, or may respectively have dynamic spring constants K3 and K4 that increase as the vibration frequency increases. In short, it is only necessary that, when the second elastic member 64, the third elastic member 83 and the fourth elastic member 87 each vibrate at a high frequency, the dynamic spring constant K2 of the second elastic member 64 is higher than the dynamic spring constant K3 of the third elastic member 83 and is higher than the dynamic spring constant K4 of the fourth elastic member 87.

In addition, at the time of high-frequency vibrations, the dynamic spring constant K2 may be equal to the dynamic spring constants K3 and K4 or the dynamic spring constant K2 may be lower than the dynamic spring constants K3 and K4.

What is claimed is:

1. An electric power steering system comprising:
a worm shaft that has a first end portion and a second end portion;
a worm wheel that is in mesh with the worm shaft and that is coupled to a steering mechanism;
a first bearing that rotatably supports the first end portion such that the worm shaft is allowed to oscillate along a central axis of the worm shaft about the first end portion, and that includes an inner ring having a raceway groove, an outer ring having a raceway groove and rolling elements interposed between the raceway grooves, wherein the outer ring has a pair of end surfaces that are aligned in an axial direction of the worm shaft;
a second bearing that rotatably supports the second end portion;
a first elastic member that elastically urges the second bearing in such a direction that an axis-to-axis distance between the worm shaft and the worm wheel reduces;
a joint that couples the first end portion to an output shaft of an electric motor such that torque is transmittable;
a second elastic member that is interposed between the joint and the first end portion, that elastically urges the worm shaft toward the second end portion, and that elastically presses the rolling elements via the worm shaft and the inner ring toward the outer ring;
a housing that accommodates the worm shaft and the worm wheel and that has a facing surface facing one of the pair of end surfaces of the first bearing outer ring and a facing surface facing the other one of the pair of end surfaces of the first bearing outer ring;
a third elastic member that is arranged between the one of the pair of end surfaces and the corresponding facing surface; and
a fourth elastic member that is arranged between the other one of the pair of end surfaces and the corresponding facing surface, wherein
a dynamic spring constant of the second elastic member when the second elastic member vibrates at a high frequency is higher than a dynamic spring constant of the third elastic member when the third elastic member vibrates at a high frequency and a dynamic spring constant of the fourth elastic member when the fourth elastic member vibrates at a high frequency.

2. The electric power steering system according to claim 1, wherein a dynamic spring constant of the second elastic member when the second elastic member vibrates at a high frequency is higher than a dynamic spring constant of the third elastic member when the third elastic member vibrates at a high frequency and a dynamic spring constant of the fourth elastic member when the fourth elastic member vibrates at a high frequency.

3. An electric power steering system for use with a steering mechanism and an electric motor having an output shaft, the system comprising:
a worm shaft including a first end portion and a second end portion;
a worm wheel configured to mesh with the worm shaft, and the worm wheel being coupled to the steering mechanism;
a first bearing configured to rotatably support the first end portion such that the worm shaft oscillates along a central axis of the worm shaft about the first end portion, and the first bearing including: (1) an inner ring having a raceway groove, (2) an outer ring having a raceway groove, and (3) a plurality of rolling elements interposed between the raceway grooves of the inner ring and the outer ring, wherein the outer ring includes a first end surface and a second end surface aligned in an axial direction of the worm shaft;
a second bearing configured to rotatably support the second end portion;
a first elastic member configured to elastically urge the second bearing in a direction such that an axis-to-axis distance between the worm shaft and the worm wheel is reduced;
a joint configured to couple the first end portion to the output shaft of the electric motor such that torque is transmittable;
a second elastic member interposed between the joint and the first end portion, the second elastic member being configured to: (1) elastically urge the worm shaft toward the second end portion, and (2) elastically press the rolling elements via the worm shaft and the inner ring toward the outer ring;
a housing configured to accommodate the worm shaft and the worm wheel, the housing including: (1) a first facing surface configured to face the first end surface of the first bearing outer ring, and (2) a second facing surface configured to face the second end surface of the first bearing outer ring;
a third elastic member disposed between the first end surface and the first facing surface; and
a fourth elastic member disposed between the second end surface and the second facing surface, wherein
when the second elastic member vibrates at a high frequency, a dynamic spring constant of the second elastic member is higher than: (1) a dynamic spring constant of the third elastic member when the third elastic member vibrates at a high frequency, and (2) a dynamic spring constant of the fourth elastic member when the fourth elastic member vibrates at a high frequency.

* * * * *